United States Patent
Tsai

(10) Patent No.: US 8,427,128 B2
(45) Date of Patent: Apr. 23, 2013

(54) CONTROL CIRCUIT AND METHOD FOR REDUCING OUTPUT RIPPLE IN CONSTANT ON-TIME SWITCHING REGULATOR

(75) Inventor: Yu-Nung Tsai, New Taipei (TW)

(73) Assignee: Richtek Technology Corporation, R.O.C., Hsin-Chu (TW)

(*) Notice: Subject to any disclaimer, the term of this patent is extended or adjusted under 35 U.S.C. 154(b) by 205 days.

(21) Appl. No.: 13/134,994

(22) Filed: Jun. 22, 2011

(65) Prior Publication Data

US 2012/0019225 A1    Jan. 26, 2012

(30) Foreign Application Priority Data

Jul. 26, 2010   (TW) ................................ 99124577 A

(51) Int. Cl.
*G05F 1/46*       (2006.01)
*G05F 1/575*      (2006.01)

(52) U.S. Cl.
USPC .......................................... 323/284; 323/285

(58) Field of Classification Search .................. 323/222, 323/223, 282, 284, 285
See application file for complete search history.

(56) References Cited

U.S. PATENT DOCUMENTS

| | | | |
|---|---|---|---|
| 7,898,237 B2 * | 3/2011 | Shao et al. | ...... 323/285 |
| 8,089,255 B2 * | 1/2012 | Chen | ...... 323/282 |
| 2010/0308733 A1 * | 12/2010 | Shao | ...... 315/119 |

* cited by examiner

*Primary Examiner* — Gary L Laxton
(74) *Attorney, Agent, or Firm* — Tung & Associates

(57) ABSTRACT

The present invention discloses a control circuit for reducing output ripple in a constant on-time switching regulator and a method thereof, for controlling a power stage. The control circuit determines whether a zero current period wherein an output current is zero is longer than a threshold period, and switches the on-time period to a shorter period if it is longer, whereby the power stage operates according to the shorter period while still in the discontinuous conduction mode (DCM).

14 Claims, 9 Drawing Sheets

ΔTS2, ΔTS3,..., ΔTSN respectively correspond to
boundary currents Iob2, Iob3,..., IobN, wherein Iob2>Iob3>...>IobN

CONTROL CIRCUIT AND METHOD FOR REDUCING OUTPUT RIPPLE IN CONSTANT ON-TIME SWITCHING REGULATOR

CROSS REFERENCE

The present invention claims priority to TW 099124577, filed on Jul. 26, 2010.

BACKGROUND OF THE INVENTION

1. Field of Invention

The present invention relates to a control circuit for reducing output ripple in a constant on-time switching regulator and a method thereof, wherein when the circuit is in light load condition, the on-time is shortened for reducing the output ripple, while the whole circuit still operates in a discontinuous conduction mode (DCM).

2. Description of Related Art

Switching regulators can be classified into two types according to how its power switch is controlled: pulse-width modulation type and frequency modulation type. In a frequency modulation type switching regulator, a circuit controlling the power switch generates a constant ON time so that the power switch is turned ON for the same time period every cycle. The whole circuitry, by modulating the frequency, adjusts the level of an output voltage to regulate the voltage to a target value. Please refer to FIG. 1, wherein a buck switching regulator is taken as an example. A prior art constant on-time (COT) switching regulator includes: a zero current detector (ZCD) 70 detecting whether an inductor current iL is about zero and generating a zero current detecting signal Vzc; a comparator 80 comparing a feedback signal Vfb representing an output voltage Vout with a reference voltage Vref to generate a feedback control signal Vc; a one-shot pulse generator 60, wherein when the feedback signal Vfb is lower than the reference signal Vref, the one-shot pulse generator 60 is controlled by the feedback control signal Vc to generate a one-shot pulse signal with a COT; and a driver 10 controlling a power stage 20 according to the one-shot pulse signal to convert an input voltage Vin to the output voltage Vout, which is supplied to a load 100. The comparator 80 may be replaced by an error amplifier generating an analog output signal.

The prior art has a drawback that the pulse generated by the one-shot pulse generator 60 has a fixed on-time, that is, in each cycle a fixed amount of power is transferred from the input side to the output side. Thus, when the circuit operates in a very light load condition, too much energy is accumulated in the output capacitor C so that the circuit generates high output ripple.

In view of the above, the present invention proposes a control circuit for reducing output ripple in a COT switching regulator and a method for reducing output ripple in a COT switching regulator.

SUMMARY OF THE INVENTION

An objective of the present invention is to provide a control circuit for reducing output ripple in a COT switching regulator.

Another objective of the present invention is to provide a method for reducing output ripple in a COT switching regulator.

To achieve the foregoing objectives, in one perspective of the present invention, it provides a control circuit for reducing output ripple in a COT switching regulator, the control circuit controlling a power stage to convert an input voltage to an output voltage and to provide an output current to a load, the control circuit comprising: a ZCD detecting a zero current period wherein the output current is about zero, and generating a zero current period signal representing the zero current period; an on-time (TON) adjustment circuit receiving the zero current period signal to determine whether the zero current period is longer than a first threshold period, and generating a TON control signal accordingly; and a COT generation circuit determining a TON of a square wave signal according to the TON control signal, the power stage being controlled according to the TON of the square wave signal, wherein when the zero current period is shorter than the first threshold period, the COT generation circuit generates the square wave signal with a longer TON, and when the zero current period is longer than the first threshold period, the COT generation circuit generates the square wave signal with a shorter TON whereby the power stage operates in a DCM according to the shorter TON.

In the foregoing control circuit, the TON adjustment circuit may include: a ramp generator generating a ramp signal according to the zero current period signal; and a comparator receiving the ramp signal and a reference signal to generating the TON control signal, wherein the reference voltage corresponds to the first threshold period.

The TON adjustment circuit may include multiple comparators each of which receives the ramp signal and a different reference signal to generate the TON control signal with multiple bits, wherein each reference voltage corresponds to one of the first threshold period and other predetermined threshold periods, respectively.

The TON adjustment circuit may alternatively generate an analog TON control signal, and it may include, for example, a low-pass filter receiving the zero current period signal to generate the analog TON control signal The COT generation circuit may include: a variable ramp generator generating a COT ramp signal according to the TON control signal; and a COT comparator receiving the COT ramp signal and comparing it with a voltage to generate the square wave signal, wherein the voltage is the output voltage, a feedback voltage related to the output voltage or a predetermined voltage.

In another perspective of the present invention, it provides a method for reducing output ripple in a COT switching regulator, the switching regulator including a power stage for converting an input voltage to an output voltage and providing an output current to a load, the method comprising: detecting a zero current period wherein the output current is about zero, and generating a zero current period signal representing the zero current period; determining whether the zero current period is longer than a first threshold period, and generating a TON control signal accordingly; generating a square wave signal with a longer on-time (TON) when the zero current period is shorter than the first threshold period, and generating a square wave signal with a first shorter TON when the zero current period is longer than the first threshold period; and controlling the power stage according to the TON of the square wave signal, wherein the power stage operates in a discontinuous conduction mode (DCM) according to the first shorter TON.

In one embodiment of the foregoing control circuit and method, the first threshold period preferably corresponds to a boundary current under the first shorter TON, and the first threshold period is calculated according to the following equation:

$$\text{first threshold period} = \frac{(Ton1 + Toff1)*(Ton1 - Ton2)}{Ton2}$$

wherein Ton1 is the longer TON; Toff1 is an OFF time corresponding to the longer TON; and Ton2 is the first shorter TON.

The foregoing method may further include: determining whether the zero current period is longer than a second threshold period, wherein the second threshold period is longer than the first threshold period; and generating a square wave signal with a second shorter TON when the zero current period is longer than the second threshold period, wherein the second shorter TON is shorter than the first shorter TON, wherein the power stage operates in the discontinuous conduction mode (DCM) according to the second shorter TON.

The objectives, technical details, features, and effects of the present invention will be better understood with regard to the detailed description of the embodiments below, with reference to the drawings.

DESCRIPTION OF THE PREFERRED EMBODIMENTS

Figure 1:
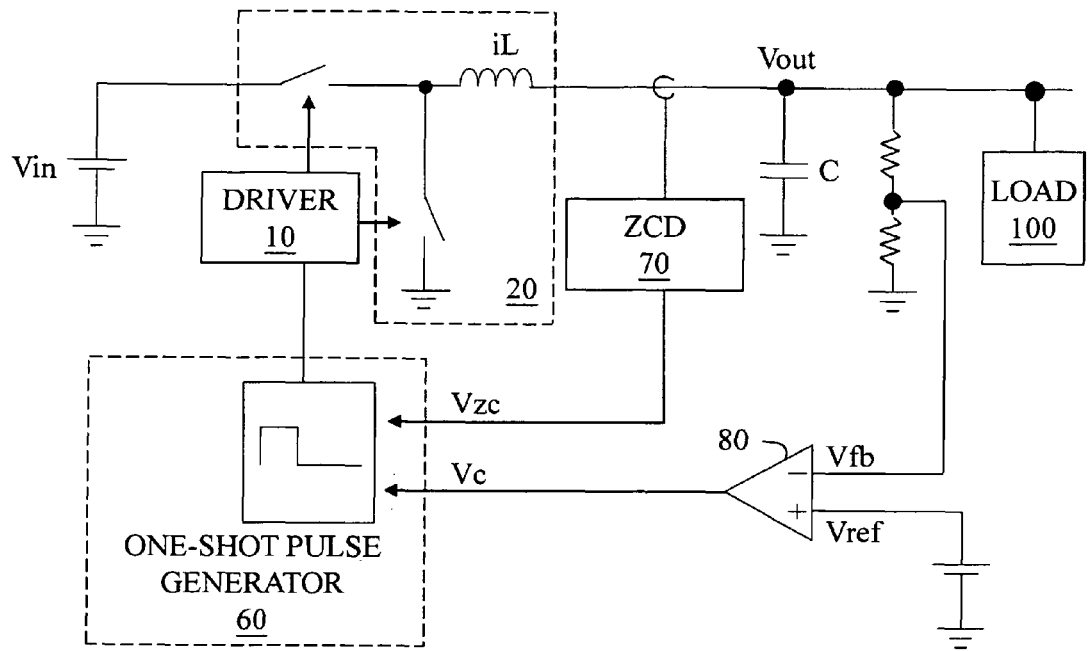
FIG. 1 shows a schematic diagram of a prior art buck COT switching regulator.
Figure 2:
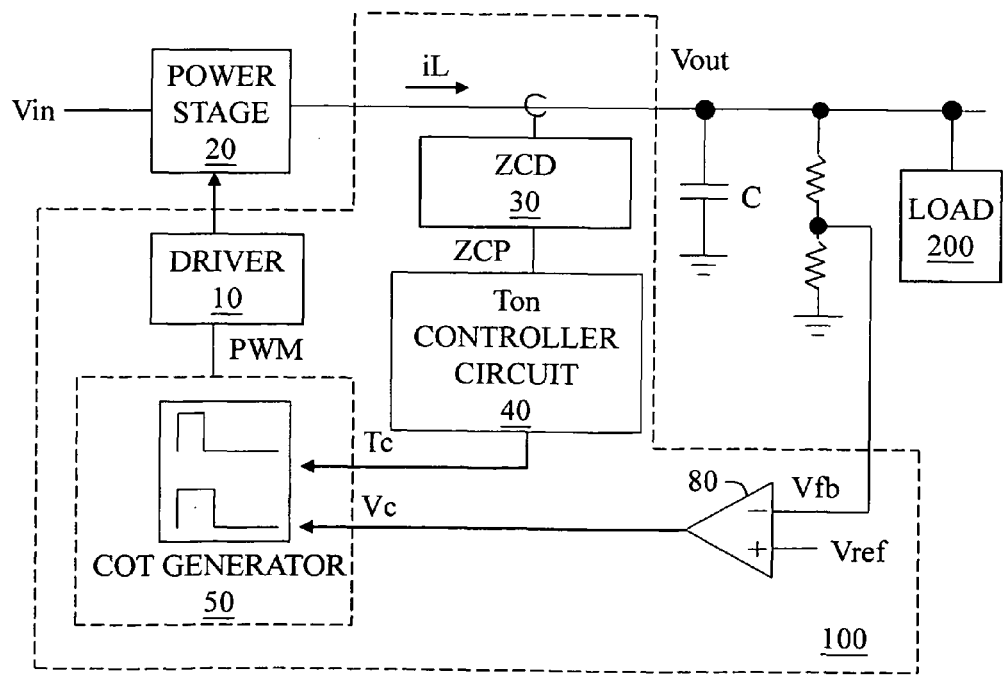
FIG. 2 shows a schematic diagram of a control circuit for reducing output ripple in a COT switching regulator according to the present invention.

FIG. 2 shows a structure of the present invention, wherein a control circuit 100 for reducing output ripple in a COT switching regulator controls a power stage 20 to convert an input voltage Vin to an output voltage Vout and to provide an output current iL to a load 200. The power stage 20 may be, as shown for example, a synchronous buck converter, but also may be other types of synchronous or asynchronous buck, boost or inverting converters. The control circuit 100 includes: a zero current detector (ZCD) 30, an on-time (TON) adjustment circuit 40, and a constant on-time (COT) generation circuit 50. In certain applications, the control circuit 100 also includes a driver 10 and a comparator 80, while in other applications, the driver 10 is not integrated in the control circuit 100. The ZCD 30 generates a zero current period signal ZCP according to the inductor current iL from the power stage 20. The on-time (TON) adjustment circuit 40 generates a TON control signal Tc according to the zero current period signal ZCP (details to be described later). The comparator 80 compares a feedback signal Vfb representing the output voltage Vout and a reference signal Vref to generating a feedback control signal Vc, wherein the comparator 80 may instead be an error amplifier and the signal Vc in this case is an analog signal. The COT generation circuit 50 generates a square wave signal PWM according to the TON control signal Tc and the error amplified signal (or digital signal) Vc; the square wave signal PWM controls a power switch (not shown) in the power stage 20 through the driver 10, wherein the error amplified signal (or digital signal) Vc determines a starting point of the period of the square wave signal PWM and the TON control signal Tc determines the TON of the square wave signal PWM. Unlike the prior art COT switching regulator, in the present invention, the TON of the square wave signal PWM is adjustable, and when the circuit is in light load condition, the TON is shortened for reducing output ripple, while the switching regulator still operates in a discontinuous conduction mode (DCM) according to the shorter TON.

Figure 3A:
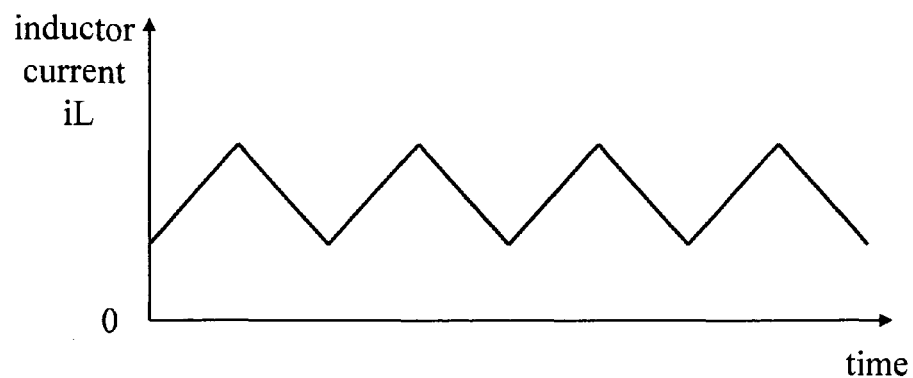
FIGS. 3A-3B illustrate a continuous conduction mode (CCM) and a discontinuous conduction mode (DCM).
Figure 3B:
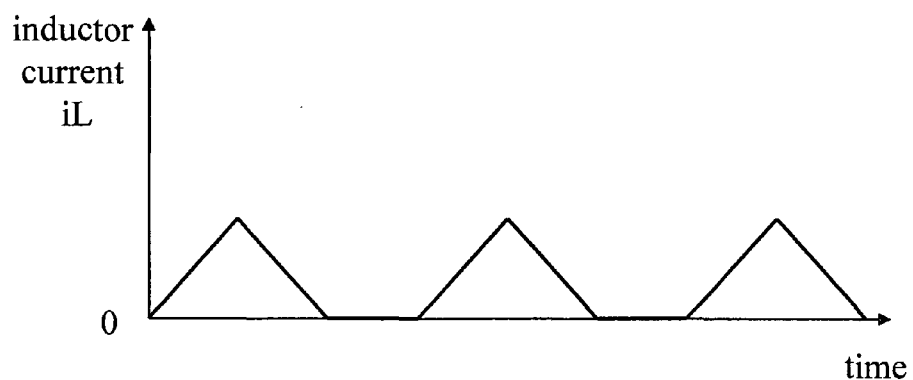

More specifically, the power stage 20 typically operates in a continuous conduction mode (CCM) or a discontinuous conduction mode (DCM), which is determined by the inductor current iL. CCM, as shown in FIG. 3A, means that the inductor current iL is in a continuous conduction status; DCM, as shown in FIG. 3B, means that the inductor current iL drops to zero within a cycle period so that the inductor current iL in two consecutive periods is discontinuous in conduction. In light load condition, the switching regulator preferably operates in DCM to reduce the switching loss of the power switch(es) in the power stage 20.

Figure 4A:
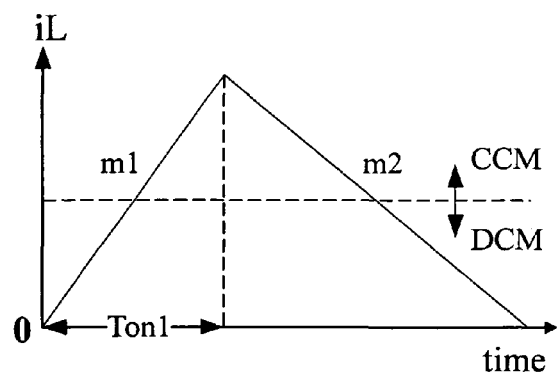
FIGS. 4A-4B illustrate a relationship between TON and boundary current.
Figure 4B:
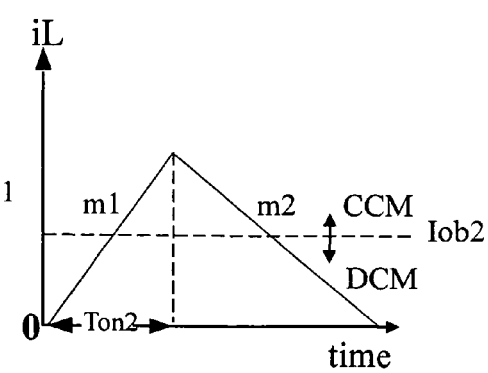

Please refer to FIGS. 4A-4B. FIG. 4A shows a waveform of the inductor current iL with a longer TON Ton1, and FIG. 4B shows a waveform of the inductor current iL with a shorter TON Ton2, wherein m1 and m2 respectively represent the slopes during an increasing inductor current period and a decreasing inductor current period; Ton1 and Ton2 are the TONs; and Iob1 and Iob2 respectively represent boundary currents related to the TONs Ton1 and Ton2. "Boundary current" means a boundary average current of the inductor current iL, or the boundary average current required by the load 200; if the average current of the inductor current iL or the average current required by the load 200 is higher than Iob1 (FIG. 4A) or Iob2 (FIG. 4B), the switching regulator operates in CCM, while if the average current of the inductor current iL or the average current required by the load 200 is lower than Iob1 (FIG. 4A) or Iob2 (FIG. 4B), the switching regulator operates in DCM. It can be understood from the figures that the boundary current Iob1 corresponding to the longer TON Ton1 is higher than the boundary current Iob2 corresponding to the shorter TON Ton2. The following is a relationship between the boundary currents Iob1 and Iob2:

$$m1 = \frac{V_{IN} - V_{OUT}}{l}; m2 = \frac{V_{OUT}}{l}$$

$$Iob1 = \frac{m1 * Ton1}{2} > Iob2 = \frac{m1 * Ton2}{2}$$

wherein l is the inductance of the inductor L of the power stage 20.

Figure 4C:
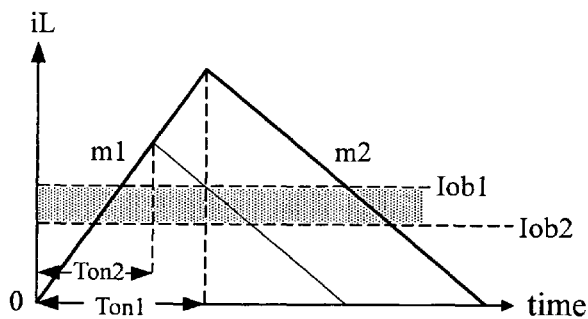
FIG. 4C shows that if the switching regulator switches from a longer TON Ton1 to a shorter TON Ton2 while the load requires a current between the boundary currents Iob1 and Iob2 (the shadow region in the figure), the switching regulator will switch from operating in DCM with the longer TON Ton1 to operating in CCM with the shorter TON Ton2.

FIG. 4C shows that if the switching regulator switches from the longer TON Ton1 to the shorter TON Ton2 while the current required by the load 200 is between the boundary currents Iob1 and Iob2 (the shadow region in the figure), the circuit will switch from the DCM with the longer TON Ton1 to the CCM with the shorter TON Ton2. However, because it is in the light load condition, the CCM increases the switching loss of the power switch(es) of the power switch 20. In some cases, a switching regulator is provided with certain control mechanism to reduce switching loss of the power switches. Under such mechanism, after the switching regulator switches from operating according to the longer TON Ton1 to operating according to the shorter TON Ton2, it would immediately switch back to the DCM with the longer TON Ton1, so the switching regulator will undesirably switches back and forth between the CCM and DCM. Therefore, if it is intended to shorten the TON in the light load condition while keeping the switching regulator operating in the DCM, the switching regulator should switch to operating according to the shorter TON Ton2 only after the average load current is lower than the reduced boundary current Iob2 so that the switching regulator does not switch back and forth between the CCM and DCM.

Figure 5:
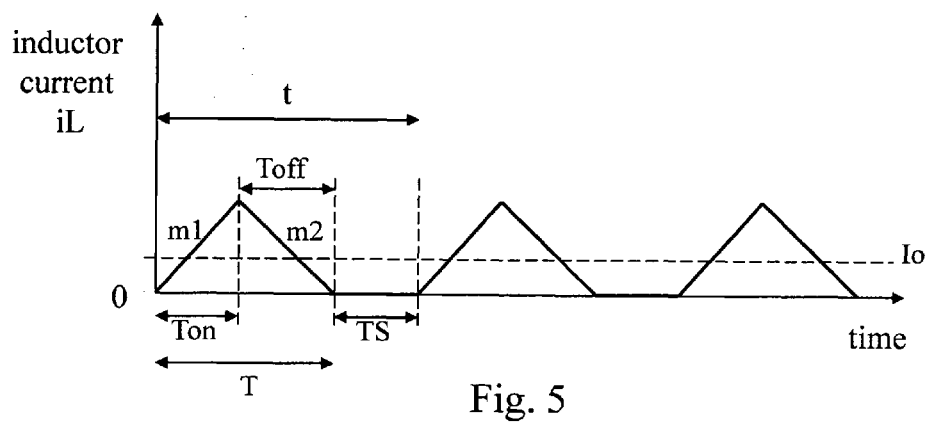
FIG. 5 explains that a zero current period TS determines an average current Io.

Referring to FIG. 5, a period t of the inductor current iL includes the on-time Ton, the off-time Toff and the zero current period TS, wherein the average current Io of the inductor current iL is obtained by dividing the area of the triangle by the period t, that is:

$$I_O = \frac{(m1 * Ton) * (Ton + Toff)}{2 * (Ton + Toff + TS)}.$$

If T=Ton+Toff, the above equation can be simplified as the following:

$$I_O = \frac{(m1 * Ton) * T}{2 * (T + TS)}$$

If the switching regulator switches from the longer TON Ton1 to the shorter TON Ton2 without entering into the CCM, the average current Io in the longer TON Ton1 should be lower than the boundary current Iob2 corresponding to the shorter TON Ton2, that is:

$$I_O = \frac{(m1 * Ton1) * T1}{2 * (T1 + TS)} \leq Iob2 = \frac{m1 * Ton2}{2} \Rightarrow Ton1 * T1 \leq Ton2 * (T1 + TS)$$

wherein T1=Ton1+Toff1, Ton1 is the longer TON and Toff1 is the corresponding off-time.

In other words, if the switching regulator switches from the longer TON Ton1 to the shorter TON Ton2 without entering into the CCM, it is required for the zero current period to be higher than a threshold period ΔTS corresponding to the boundary current Iob2, which is:

$$\Delta TS = \frac{T1 * (Ton1 - Ton2)}{Ton2}$$

Figure 6:
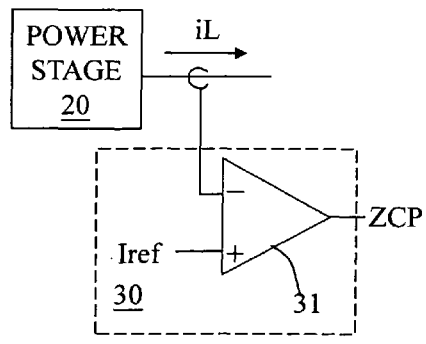
FIG. 6 shows an embodiment of a zero current detector (ZCD) according to the present invention.
Figure 6:
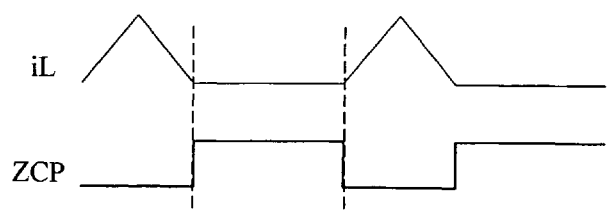

Referring back to FIG. 2, according to the above, the present invention operates as follows: The ZCD 30 generates a zero current period signal ZCP according to the inductor current iL from the power stage 20, and the TON adjustment circuit 40 generating the TON control signal Tc to determine the TON of the square wave signal PWM according to the zero current period signal ZCP, by judging whether the zero current period of the inductor current iL is longer than the threshold period ΔTS. The ZCD 30 can be embodied in various forms, and one embodiment according to the present invention is shown in FIG. 6, wherein the ZCD 30 includes a current comparator 31 comparing the detected inductor current iL with a reference zero current Iref, and generating the zero current period signal ZCP in digital form to indicate the period wherein the inductor current iL is zero. The ZCD 30 may further include other circuits which can filter noises (such as a low-pass filter which is not shown in the figure), and the ZCD 30 is not limited to the current comparator 31 as shown, but instead can be, for example, an operational amplifier generating the zero current period signal ZCP in analog form, etc.

Figure 7A:
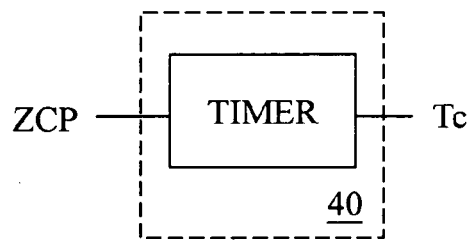
FIG. 7A illustrates a concept of a TON adjustment circuit according to the present invention.
Figure 7A:
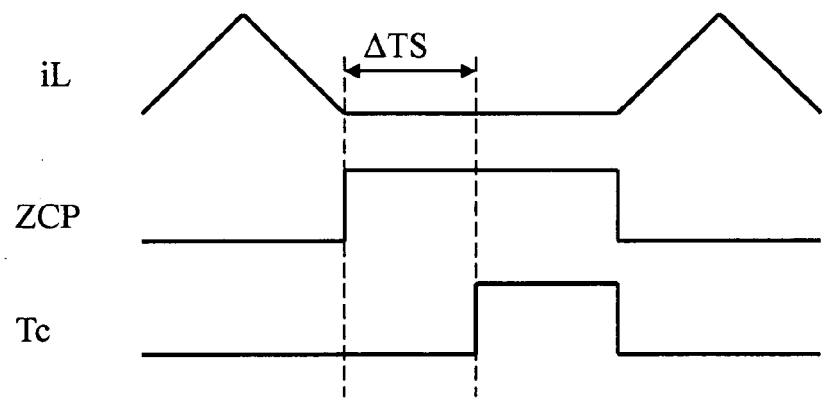

As mentioned above, the TON adjustment circuit 40 judges whether the zero current period of the inductor current iL is longer than the threshold period ΔTS. If the zero current period is longer than the threshold period ΔTS, the switching regulator can switch from the longer TON Ton1 to the shorter TON Ton2 without entering into the CCM. If the zero current period is shorter than the threshold period ΔTS, it is not preferable to shorten the TON. The concept can be understood from FIG. 7A, wherein if the zero current period signal ZCP is a digital signal shown in FIG. 6, the TON adjustment circuit 40 can be a timer calculating the high level duration of the zero current period signal ZCP. If the high level duration is longer than the threshold period ΔTS, a high level TON control signal Tc in digital form is generated.

Figure 7B:
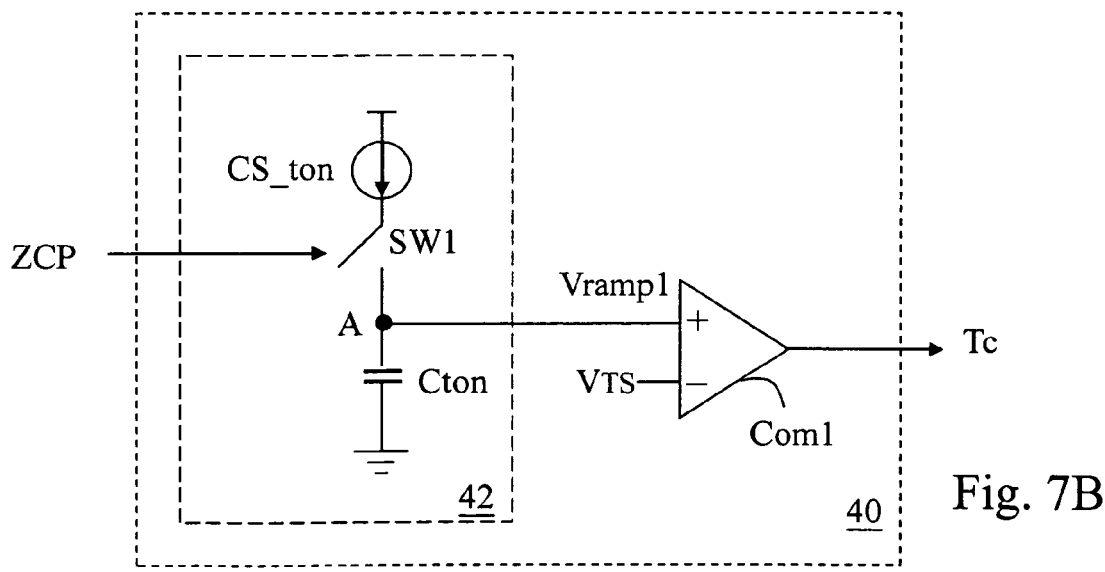
FIG. 7B shows an embodiment of the TON adjustment circuit according to the present invention.

The TON adjustment circuit 40 can be embodied in various forms. For example, according to the equation "time=voltage*capacitance/current", the threshold period ΔTS and the zero current period signal ZCP can be respectively converted to proper voltage levels, and then compared with each other to determine whether the zero current period is longer than the threshold period ΔTS. More specifically, if the zero current period signal ZCP is the digital signal shown in FIG. 6, according to one embodiment of the present invention shown in FIG. 7B, the TON adjustment circuit 40 may include a ramp generator 42 and a comparator Com1, wherein the ramp generator 42 includes a current source CS_ton, a switch SW1 and a capacitor Cton. The switch SW1 is controlled by the zero current period signal ZCP, so that the ramp generator 42 generates a ramp signal Vramp1 at a node A. The comparator Com1 compares the ramp signal Vramp1 with a reference voltage VTS, wherein the reference voltage VTS corresponds to the threshold period ΔTS. In this way, the digital output from the comparator Com1, i.e., the TON control signal Tc, indicates whether the zero current period of the inductor current iL is longer than the threshold period ΔTS. (The TON control signal Tc is not limited to a digital signal; it can be an analog signal, which is to be described later.)

Figure 8:
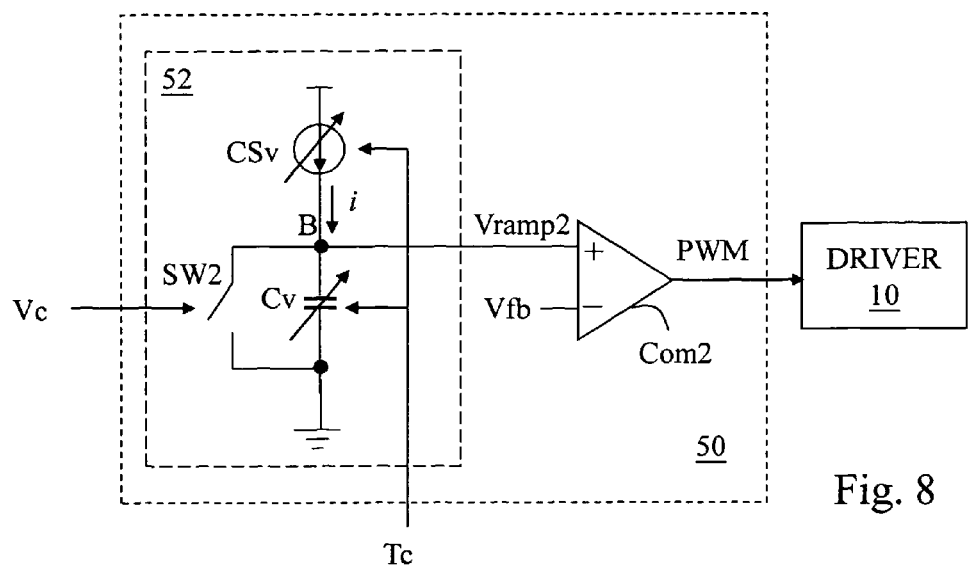
FIG. 8 shows an embodiment of a COT generation circuit according to the present invention.

There are many ways for the COT generation circuit 50 to generate different COTs. Referring to FIG. 8, the COT generation circuit 50 includes, for example, a variable ramp generator 52 and a COT comparator Com2. The variable ramp generator 52 includes a current source CSv, a switch SW2 and a capacitor Cv. The switch SW2 is controlled by the feedback control signal Vc so that the variable ramp generator 52 generates a COT ramp signal Vramp2 at a node B. In the variable ramp generator 52, the current i of the current source CSv and/or the capacitance of the capacitor Cv is controllable by the control signal Tc, to change the slope and/or the peak value of the COT ramp signal Vramp2 such that the COT comparator Com2 is capable of generating different square wave signals with different TONs. In this embodiment, the COT comparator Com2 compares the COT ramp signal Vramp2 with the feedback signal; however in other embodiments, the COT comparator Com2 may compare the COT ramp signal Vramp2 with the output voltage Vout or a predetermined reference voltage.

Figure 9:
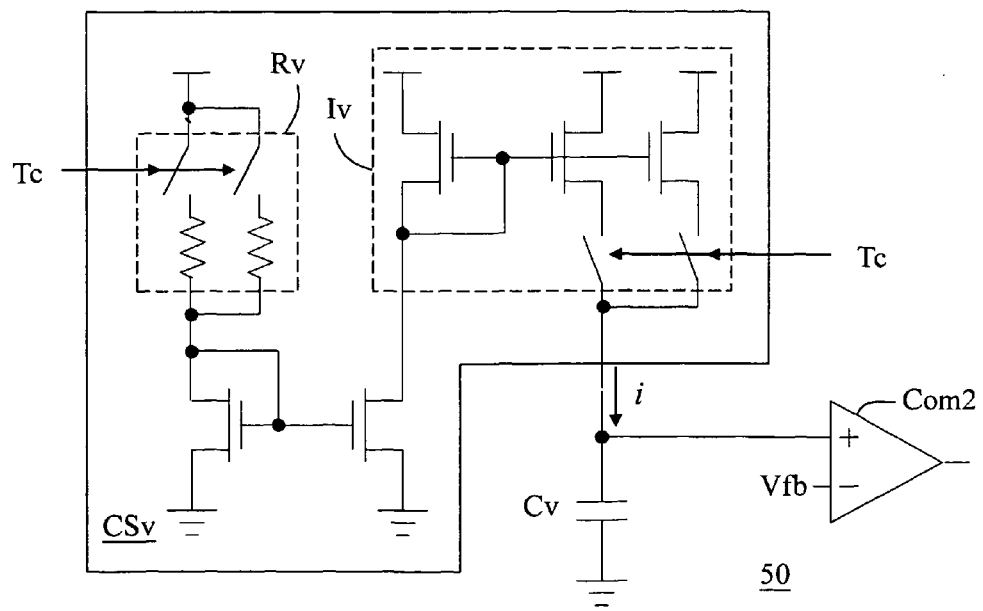
FIGS. 9-10 show two other more specific embodiments of the COT generation circuit according to the present invention.
Figure 10:
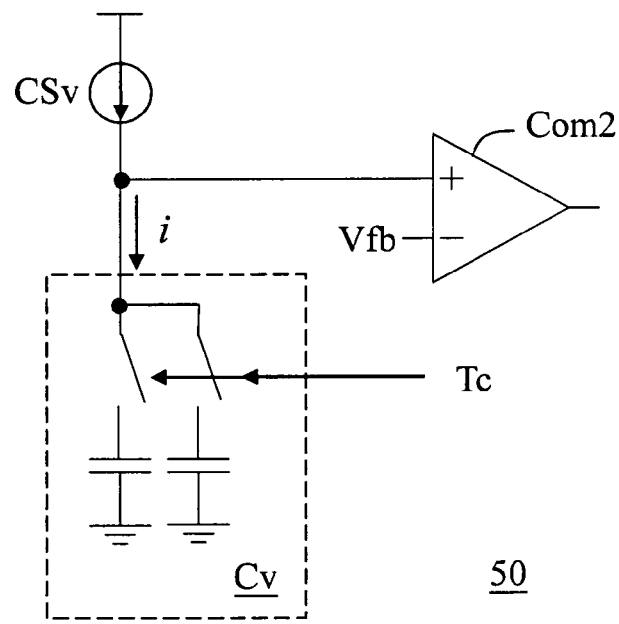

FIG. 9 shows an example as to how the TON control signal Tc controls the current i of the current source CSv in the variable ramp generator 52, wherein the TON control signal Tc controls a variable resistor Rv shown in the left of the figure, or controls the ratio of a current mirror Iv shown in the upper right of the figure. FIG. 10 shows an example as to how the TON control signal Tc controls the capacitance of the capacitor Cv in the variable ramp generator 52, wherein the TON control signal Tc determines the connection of a parallel capacitor circuit to control the capacitance of the capacitor circuit Cv. Any one or all of the above methods can be used to adjust the TON of the square wave signal PWM.

Figure 11:
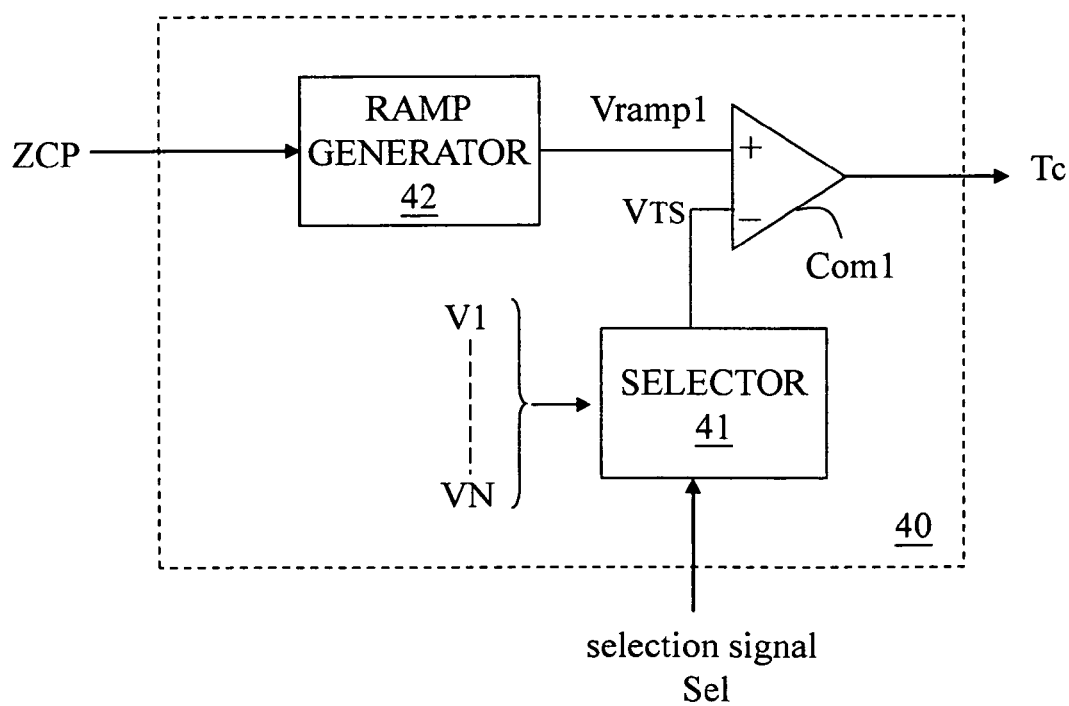
FIG. 11 shows another embodiment of the TON adjustment circuit according to the present invention.

According to the present invention, for example, the TON in normal load condition can be set as the longer TON Ton1, while the TON in light load condition can be set as the shorter TON Ton2; the TON Ton2 may be a constant pre-set in the circuit, or may be dynamically set externally. Referring to FIG. 11 for the latter case, the TON adjustment circuit 40 may further include a selector 41 selecting one of the predetermined voltages V1~VN as the reference voltage VTS according to a selection signal Sel; that is, the reference voltage VTS is dynamically adjusted in correspondence to a different threshold period ΔTS (or it can be taken as that one among many threshold period ΔTS is selected), so as to generate a different TON Ton2, wherein the selection signal Sel for example can be generated from the load 200 or other external circuits, or can be manually set.

Figure 12:
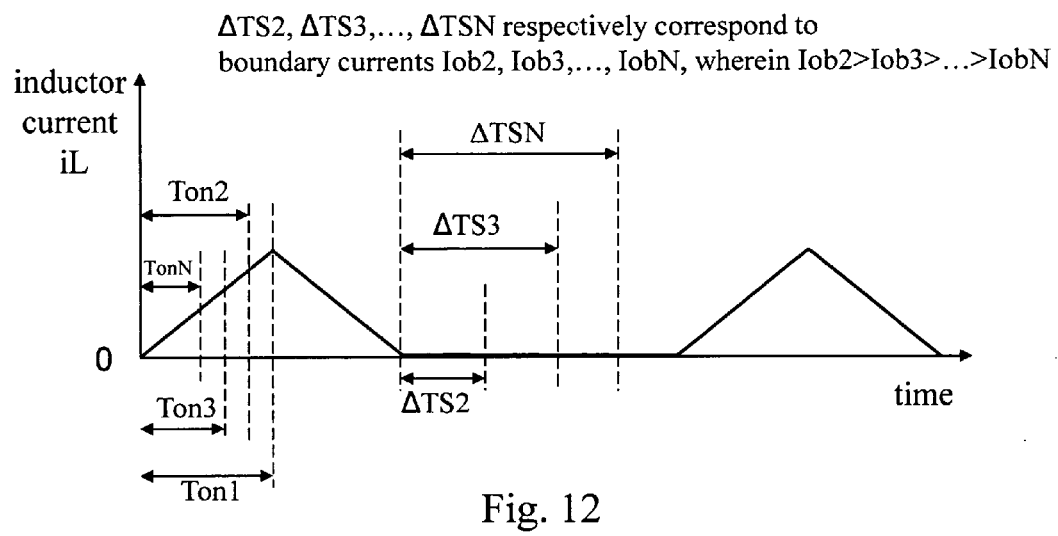
FIG. 12 shows a relationship between different TONs Ton2~TonN and different threshold periods ΔTS2~ΔTSN.

In addition, in present invention, the TONs of the square wave signal PWM are not limited to only two options, i.e., only TONs Ton1 and Ton2, but also can be three or more, i.e., TONs Ton1, Ton2, . . . , TonN, wherein Ton1>Ton2> . . . >TonN. Referring to FIG. 12, different threshold periods ΔTS2, ΔTS3, . . . , ΔTSN can be obtained according to relationships between Ton1 and Ton2, . . . , TonN, respectively, and each threshold period ΔTS2, ΔTS3, . . . , ΔTSN corresponds to one of the boundary currents Iob2, Iob3, . . . , IobN:

$$\Delta TSM = \frac{T1 * (Ton1 - TonM)}{TonM},$$

wherein M=2~N.

Figure 13:
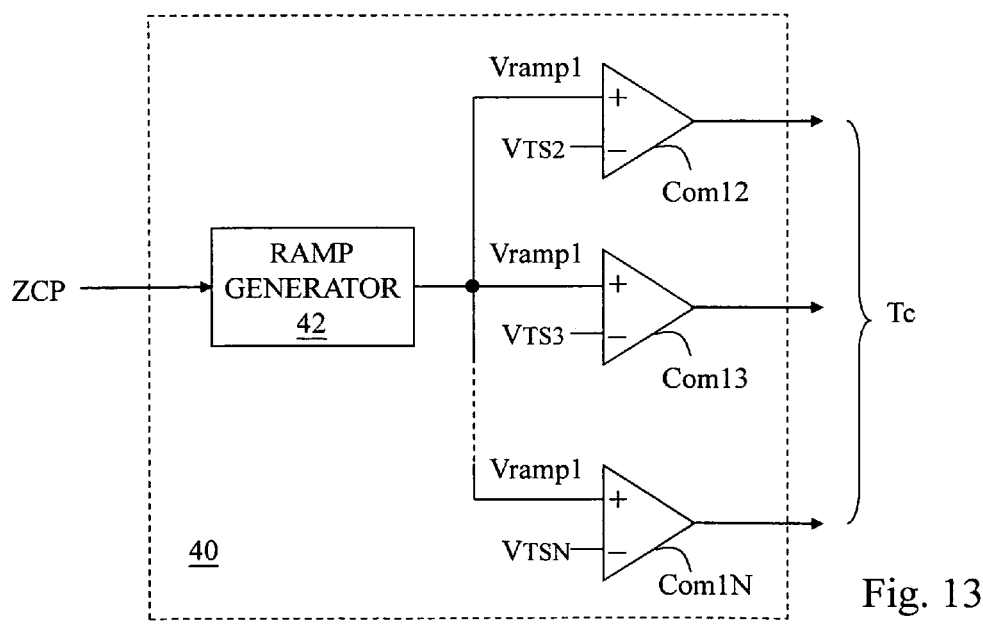
FIG. 13 shows another embodiment of the TON adjustment circuit according to the present invention.

Thus, as shown in FIG. 13, the TON adjustment circuit 40 may further include multiple comparators Com12~Com1N respectively comparing the ramp signal Vramp1 with the voltages VTS2~VTSN to generate the TON control signal Tc which is a digital signal with multiple bits, wherein each reference voltage VTS2~VTSN corresponds to one of the threshold periods ΔTS2~ΔTSN. In other words, the TON adjustment circuit 40 can determine which one of the TONs Ton2~TonN is the optimal TON according to a relationship between the load current and the boundary currents Iob2~IobN.

Figure 14:
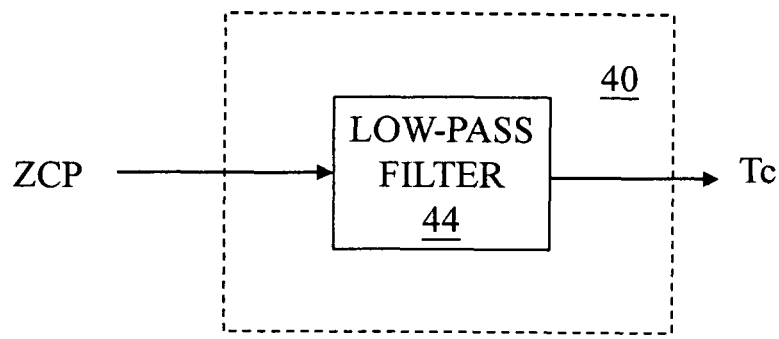
FIG. 14 shows a further other embodiment of the TON adjustment circuit according to the present invention, wherein it generates an analog TON control signal Tc.
Figure 15:
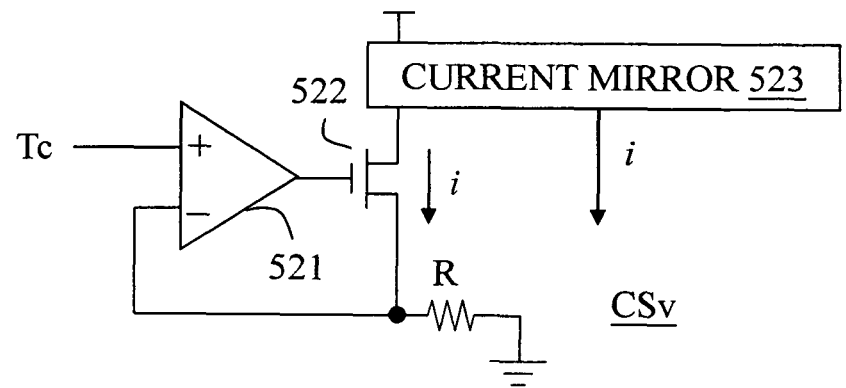
FIG. 15 shows a current source CSv which can be applied in a variable ramp generator 52 to cooperate with the TON control signal Tc.
Figure 16A:
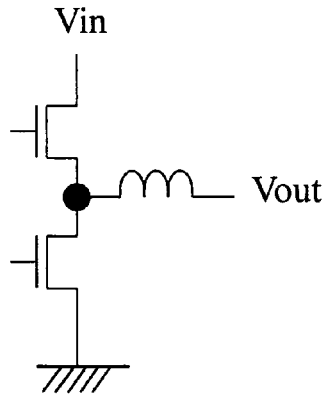
FIGS. 16A-16G show several embodiments of the power stage of a switching regulator.
Figure 16B:
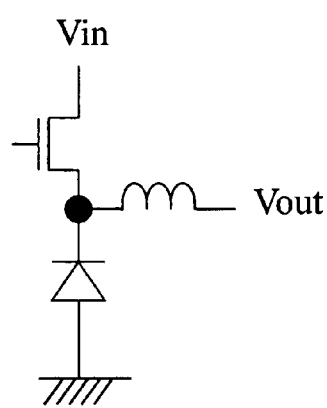
Figure 16C:
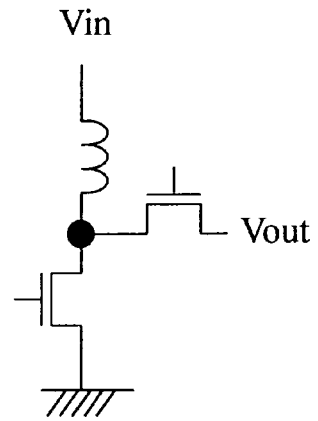
Figure 16D:
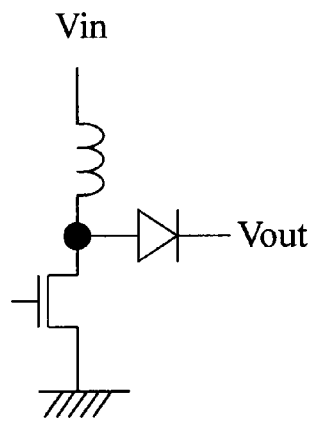
Figure 16E:
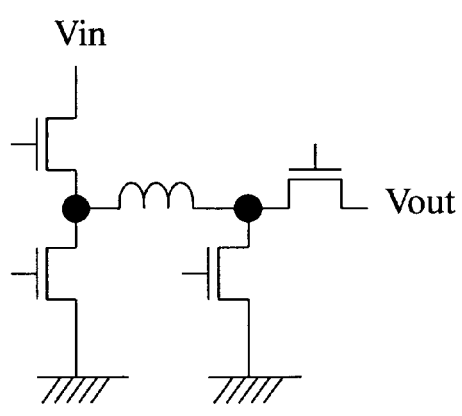
Figure 16F:
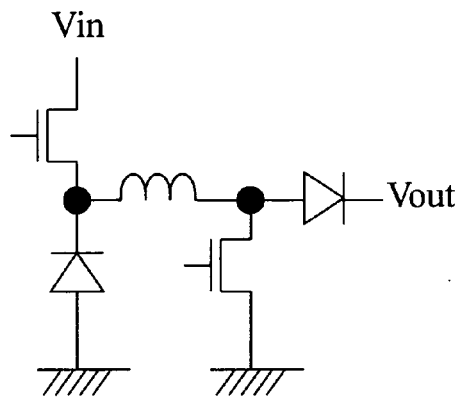
Figure 16G:
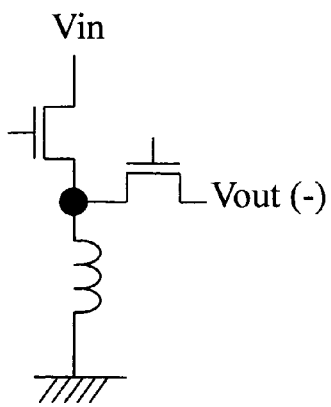

The TON control signal Tc is a digital signal in the above embodiments, but it also can be an analog signal. Referring to FIG. 14, the TON adjustment circuit 40 may further include a low-pass filter converting the zero current period signal ZCP to an analog voltage signal Tc. In correspondence to such analog voltage signal Tc, the current source CSv of the ramp generator 52 may be as shown in FIG. 15, which includes an error amplifier 521, a transistor 522, a resistor R, and a current mirror 523. When the circuit is in a balanced state, the voltages at the two input terminals of the error amplifier 521 are equal to each other, that is, Tc=i*R. In other words, the current i can be adjusted by changing the voltage Tc. Note that the reference voltage at the positive input terminal of the error amplifier 521 is not necessarily the TON control signal Tc itself, but instead can be a multiple or fraction of the TON control signal Tc, or an analog signal converted from the digital TON control signal Tc.

Also please note that, though it is described in the above embodiments that "the threshold period ΔTS corresponds to the boundary current Iob2, and the zero current period TS should be longer than the threshold period ΔTS", clearly, if the threshold period ΔTS corresponds to any current lower than the boundary current Iob2, the switching regulator will certainly not operate in CCM according to such shorter TON. So, it is not necessary for the threshold period ΔTS to correspond to the boundary current Iob2.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device which does not affect the primary functions of the circuits can be interposed between two devices or circuits shown to be in direct connection in the illustrated embodiments. As another example, the meanings of "high level" and "low level" can be swapped, and the power switches in the power stage 20 and the ramp generators may be NMOSFET or PMOSFET as long as the details in the circuits are correspondingly modified. As another example, the power stage of the present invention should not be limited to a synchronous buck converter, but also can be a synchronous or asynchronous buck, boost, inverting or buck-boost converter as shown in FIGS. 16A-16G. Further, in the variable ramp generator 52 shown in the embodiments, the current source CSv charges the capacitor Cv, but it can be modified so that the current source CSv discharges the capacitor Cv. Thus, the present invention should cover all such and other modifications and variations, which should be interpreted to fall within the scope of the following claims and their equivalents.

What is claimed is:

1. A control circuit for reducing output ripple in a constant on-time switching regulator, the control circuit controlling a power stage to convert an input voltage to an output voltage and to provide an output current to a load, the control circuit comprising:
    a zero current detector (ZCD) detecting a zero current period wherein the output current is about zero, and generating a zero current period signal representing the zero current period;
    an on-time (TON) adjustment circuit receiving the zero current period signal to determine whether the zero current period is longer than a first threshold period, and generating a TON control signal accordingly; and a constant on-time (COT) generation circuit determining a TON of a square wave signal according to the TON control signal, the power stage being controlled according to the TON of the square wave signal, wherein when the zero current period is shorter than the first threshold period, the COT generation circuit generates the square wave signal with a longer TON, and when the zero current period is longer than the first threshold period, the COT generation circuit generates the square wave signal with a shorter TON whereby the power stage operates in a discontinuous conduction mode (DCM) according to the shorter TON.

2. The control circuit of claim 1, wherein the first threshold period corresponds to a boundary current under the shorter TON, and the first threshold period is calculated according to the following equation:

$$\text{first threshold period} = \frac{(Ton1 + Toff1)*(Ton1 - Ton2)}{Ton2}$$

wherein Ton1 is the longer TON; Toff1 is an OFF time corresponding to the longer TON; and Ton2 is the shorter TON.

3. The control circuit of claim 1, wherein the TON adjustment circuit converts the zero current period signal and the first threshold period to voltage levels respectively, and compares the voltage levels to determine whether the zero current period is longer than the first threshold period.

4. The control circuit of claim 1, wherein the TON adjustment circuit includes:
a ramp generator generating a ramp signal according to the zero current period signal; and
a comparator receiving the ramp signal and a reference signal to generating the TON control signal, wherein the reference voltage corresponds to the first threshold period.

5. The control circuit of claim 4, wherein the TON adjustment circuit further includes: a selection circuit receiving multiple voltage signals, and selecting one of the multiple voltage signals as the reference voltage corresponding to the first threshold period according to a selection signal.

6. The control circuit of claim 4, wherein the TON adjustment circuit includes: multiple comparators each of which receives the ramp signal and a different reference signal to generate the TON control signal with multiple bits, wherein each reference voltage corresponds to one of the first threshold period and other predetermined threshold periods, respectively.

7. The control circuit of claim 6, wherein the COT generation circuit generates different square wave signals with different shorter TONs according to the TON control signal with multiple bits.

8. The control circuit of claim 1, wherein the COT generation circuit includes:
a variable ramp generator generating a COT ramp signal according to the TON control signal; and
a COT comparator receiving the COT ramp signal and comparing it with a voltage to generate the square wave signal, wherein the voltage is the output voltage, a feedback voltage related to the output voltage or a predetermined voltage.

9. The control circuit of claim 7, wherein the variable ramp generator includes a current source and a capacitor connected in series to each other, wherein the current source provides a current controllable by the TON control signal, or the capacitor has a capacitance controllable by the TON control signal.

10. The control circuit of claim 1, wherein the TON adjustment circuit includes: a low-pass filter receiving the zero current period signal to generate an analog TON control signal.

11. A method for reducing output ripple in a constant on-time switching regulator, the switching regulator including a power stage for converting an input voltage to an output voltage and providing an output current to a load, the method comprising:

detecting a zero current period wherein the output current is about zero, and generating a zero current period signal representing the zero current period;

determining whether the zero current period is longer than a first threshold period, and generating a TON control signal accordingly;

generating a square wave signal with a longer on-time (TON) when the zero current period is shorter than the first threshold period, and generating a square wave signal with a first shorter TON when the zero current period is longer than the first threshold period; and controlling the power stage according to the TON of the square wave signal, wherein the power stage operates in a discontinuous conduction mode (DCM) according to the first shorter TON.

12. The method of claim 11, wherein the first threshold period corresponds to a boundary current under the first shorter TON, and the first threshold period is calculated according to the following equation:

$$\text{first threshold period} = \frac{(Ton1 + Toff1)*(Ton1 - Ton2)}{Ton2}$$

wherein Ton1 is the longer TON; Toff1 is an OFF time corresponding to the longer TON; and Ton2 is the first shorter TON.

13. The method of claim 11, further comprising: selecting one among multiple threshold periods as the first threshold period according to a selection signal.

14. The method of claim 11, further comprising:
determining whether the zero current period is longer than a second threshold period, wherein the second threshold period is longer than the first threshold period; and
generating a square wave signal with a second shorter TON when the zero current period is longer than the second threshold period, wherein the second shorter TON is shorter than the first shorter TON,
wherein the power stage operates in the discontinuous conduction mode (DCM) according to the second shorter TON.

* * * * *